(12) United States Patent
Goodsitt et al.

(10) Patent No.: US 12,265,894 B2
(45) Date of Patent: Apr. 1, 2025

(54) HIERARCHICAL SYSTEM AND METHOD FOR GENERATING INTERCORRELATED DATASETS

(71) Applicant: CAPITAL ONE SERVICES, LLC, McLean, VA (US)

(72) Inventors: Jeremy Goodsitt, Champaign, IL (US); Austin Walters, Savoy, IL (US); Vincent Pham, Champaign, IL (US); Fardin Abdi Taghi Abad, Seattle, WA (US)

(73) Assignee: Capital One Services, LLC, McLean, VA (US)

( * ) Notice: Subject to any disclaimer, the term of this patent is extended or adjusted under 35 U.S.C. 154(b) by 996 days.

(21) Appl. No.: 17/317,010

(22) Filed: May 11, 2021

(65) Prior Publication Data
US 2021/0264277 A1 Aug. 26, 2021

Related U.S. Application Data

(63) Continuation of application No. 16/748,415, filed on Jan. 21, 2020, now Pat. No. 11,030,526.

(51) Int. Cl.
| | | |
|---|---|---|
| G06N 20/00 | (2019.01) | |
| G06F 18/2413 | (2023.01) | |
| G06N 3/02 | (2006.01) | |
| G06N 3/044 | (2023.01) | |
| G06N 3/045 | (2023.01) | |
| G06N 3/08 | (2023.01) | |

(Continued)

(52) U.S. Cl.
CPC ....... *G06N 20/00* (2019.01); *G06F 18/24143* (2023.01); *G06N 3/02* (2013.01); *G06N 3/045* (2023.01); *G06N 3/08* (2013.01); *G06N 20/10* (2019.01); *G06N 20/20* (2019.01); *G06N 3/044* (2023.01)

(58) Field of Classification Search
CPC .......... G06N 3/02; G06N 3/044; G06N 3/045; G06N 3/08; G06N 20/00; G06N 20/10; G06N 20/20; G06F 18/24143
USPC ........................................................ 706/25
See application file for complete search history.

(56) References Cited

U.S. PATENT DOCUMENTS

| | | |
|---|---|---|
| 2018/0165475 A1 | 6/2018 | Veeramachaneni et al. |
| 2019/0138270 A1 | 5/2019 | Dolph et al. |
| 2019/0295536 A1 | 9/2019 | Sapugay et al. |

(Continued)

*Primary Examiner* — Shane D Woolwine
(74) *Attorney, Agent, or Firm* — Foley & Lardner LLP

(57) ABSTRACT

Systems and methods for generating synthetic intercorrelated data are disclosed. For example, a system may include at least one memory storing instructions and one or more processors configured to execute the instructions to perform operations. The operations may include training a parent model by iteratively performing steps. The steps may include generating, using the parent model, first latent-space data and second latent-space data. The steps may include generating, using a first child model, first synthetic data based on the first latent-space data, and generating, using a second child model, second synthetic data based on the second latent-space data. The steps may include comparing the first synthetic data and second synthetic data to training data. The steps may include adjusting a parameter of the parent model based on the comparison or terminating training of the parent model based on the comparison.

20 Claims, 6 Drawing Sheets

(51) Int. Cl.
_G06N 20/10_ (2019.01)
_G06N 20/20_ (2019.01)

(56) References Cited

U.S. PATENT DOCUMENTS

2020/0035234 A1    1/2020  Aarabi
2020/0356835 A1*  11/2020  Robinson ............... G06N 3/088

* cited by examiner

HIERARCHICAL SYSTEM AND METHOD FOR GENERATING INTERCORRELATED DATASETS

This application is a continuation of application Ser. No. 16/748,415, filed Jan. 21, 2020, now allowed, which is incorporated herein by reference in its entirety.

BACKGROUND

Systems and methods to generate synthetic correlated datasets are needed in many fields, including data management, science, finance, engineering, environmental monitoring, water supply systems, climate studies, health care, and many other areas of human activity. Conventional methods to generate synthetic data may include using a machine learning model, such as a generative adversarial network (GAN) model.

Problems arise in conventional approaches when using models to generate synthetic datasets that imitate real datasets which are correlated with each other (i.e., intercorrelated dataset sets). For example, a first training dataset and second training dataset may be correlated. Although the first model may generate a first synthetic dataset that may be similar to a first training dataset, and a second model may generate a second synthetic data that may be similar to a second training dataset, the first synthetic dataset and second synthetic dataset may not be correlated to each other. Hence, conventional approaches may be inaccurate.

As an illustrative example, a first training dataset may include violin audio data playing a song and a second training dataset may include cello audio data playing the same song such that, when played together, the violin and cello dataset produce harmonies, counterpoints, and the like. Using these data, a conventional approach may include training a violin model to generate synthetic violin data and training a cello model to generate synthetic cello data. However, when played simultaneously, conventional synthetic violin data and conventional synthetic cello data may fail to produce harmonies, counterpoints, etc. That is, the synthetic datasets may be weakly correlated (e.g., synthetic violin data and synthetic cello data may sound like different songs) or have correlations that are not present in the original data (e.g., synthetic violin data and synthetic cello data may sound like similar songs played in different keys or at different tempos). Similar problems arise in data modeling for other fields (e.g., environmental data modeling, financial data modeling, etc.).

One conventional solution to this problem is to train a single model to generate a plurality of intercorrelated datasets. That approach, however, may be inefficient. A single model that generates intercorrelated datasets may be large (e.g., contain many neural network layers), so a single model may consume large amounts of computational resources during training.

In addition, a single model may be brittle and require changes in model architecture if additional intercorrelated datasets are modeled or if training data are updated. In practical situations, additional data sources may be identified. To continue the previous example, a change in model architecture may be needed if a viola training dataset is added after training a single model to generate violin and cello data. In practical situations, data sources may change over time (e.g., data may be updated). Referring again to the previous example, a change in model architecture may be needed if a style of music is desired (e.g., if synthetic baroque music is desired when a model was trained to generate synthetic classical music). Such changes in model architecture may wastefully consume resources.

In view of the shortcomings and problems with conventional approaches to generating synthetic intercorrelated data, there is a need for unconventional approaches that accurately and efficiently train models to generate intercorrelated, synthetic data.

SUMMARY

The disclosed embodiments provide unconventional methods and systems for generating synthetic intercorrelated datasets. Embodiments consistent with the present disclosure are rooted in computer technology and may include using a hierarchical approach. A hierarchical approach may include training child models to generate individual datasets and training parent models to provide latent space data that, when passed to child models as input, result in intercorrelated synthetic datasets as output of the child models. This approach is advantageous over the conventional approach because, among other reasons, this approach results in faster training times, more flexible models, and more accurate models. That is, as a number of intercorrelated datasets changes or when intercorrelated datasets are updated, child and parent models may be rapidly added and/or trained. Further, child models may be substituted for one another. Substitution may require additional training of a parent model based on a similarity between a substitute child model and an original model. For example, a parent model may be trained to compose music (generate synthetic musical scores) for a plurality of child models corresponding to singers in a chorus, and the child models may be substituted with child models corresponding to instruments in an orchestra such that the parent model may compose music for the orchestra with little or no retraining of the parent model. Accordingly, the embodiments provide advantages by increasing accuracy and reducing resource use when generating synthetic intercorrelated data.

Consistent with the present embodiments, a system for generating synthetic intercorrelated datasets is disclosed. The system may include at least one memory storing instructions and one or more processors configured to execute the instructions to perform operations. The operations may include training a parent model by iteratively performing steps. The steps may include generating, using the parent model, first latent-space data and second latent-space data. The steps may include generating, using a first child model, first synthetic data based on the first latent-space data, and generating, using a second child model, second synthetic data based on the second latent-space data. The steps may include comparing the first synthetic data and second synthetic data to training data. The steps may include adjusting a parameter of the parent model based on the comparison or terminating training of the parent model based on the comparison.

Consistent with the present embodiments, a method for generating synthetic intercorrelated datasets is disclosed. The method may include training a parent model by iteratively performing steps. The steps may include generating, using the parent model, first latent-space data and second latent-space data. The steps may include generating, using a first child model, first synthetic data based on the first latent-space data, and generating, using a second child model, second synthetic data based on the second latent-space data. The steps may include comparing the first synthetic data and second synthetic data to training data. The steps may include adjusting a parameter of the parent model based on the comparison or terminating training of the parent model based on the comparison.

Consistent with other disclosed embodiments, non-transitory computer readable storage media may store program instructions, which are executed by at least one processor device and perform any of the methods described herein.

The disclosed systems and methods may be implemented using a combination of conventional hardware and software as well as specialized hardware and software, such as a machine constructed and/or programmed specifically for performing functions associated with the disclosed method steps. The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Consistent with disclosed embodiments, systems and methods for generating synthetic, intercorrelated data are disclosed. As explained above, disclosed systems and methods provide accuracy, efficiency, and cost advantages over conventional approaches to clustering data.

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
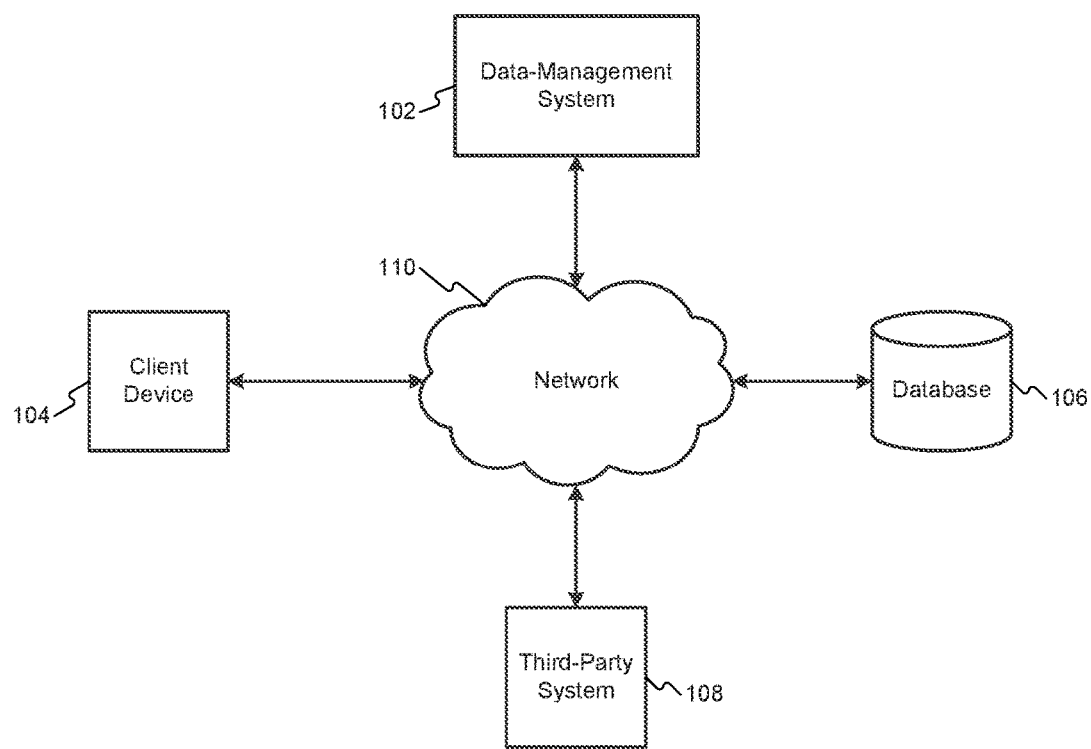
FIG. 1 is a block diagram of an exemplary system for generating intercorrelated datasets, consistent with disclosed embodiments.

FIG. 1 is a block diagram of an exemplary system 100 for generating intercorrelated datasets, consistent with disclosed embodiments. As shown, system 100 may include a data-management system 102, a client device 104, a database 106, and a third-party system 108. Components of system 100 may be connected to each other via a network 110.

In some embodiments, aspects of system 100 may be implemented on one or more cloud services designed to generate ("spin-up") one or more ephemeral container instances (e.g., AMAZON LAMBDA instances) in response to event triggers, assign one or more tasks to a container instance, and terminate ("spin-down") a container instance upon completion of a task. By implementing methods using cloud services, disclosed systems may efficiently provision resources based on demand and provide security advantages because the ephemeral container instances may be closed and destroyed upon completion of a task. That is, the container instances do not permit access from outside using terminals and/or remote shell tools like SSH, RTP, FTP, and/or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of data-management systems, client devices, databases, third-party systems and/or networks. In addition, system 100 may further include other components and/or devices not depicted that perform and/or assist in the performance of one or more processes, consistent with the disclosed embodiments. The exemplary components and arrangements shown in FIG. 1 are not intended to limit the disclosed embodiments.

Data-management system 102 may include a computing device, a computer, a server, a server cluster, a plurality of server clusters, and/or a cloud service, consistent with disclosed embodiments. Data-management system 102 may include at least one memory and one or more processors configured to perform operations consistent with disclosed embodiments. Data-management system 102 may include computing systems configured to generate, receive, retrieve, store, and/or provide data models and/or datasets, consistent with disclosed embodiments. Data-management system 102 may include computing systems configured to generate and train models, consistent with disclosed embodiments. Data-management system 102 may be configured to receive data from, retrieve data from, and/or transmit data to other components of system 100 and/or computing components outside system 100 (e.g., via network 110). Data-management system 102 is disclosed in greater detail below (in reference to FIG. 4).

Client device 104 may include one or more memory units and one or more processors configured to perform operations consistent with disclosed embodiments. In some embodiments, client device 104 may include hardware, software, and/or firmware modules. Client device 104 may be a user device. Client device 104 may include a mobile device, a tablet, a personal computer, a terminal, a kiosk, a server, a server cluster, a cloud service, a storage device, a specialized device configured to perform methods according to disclosed embodiments, or the like.

Database 106 may include one or more databases configured to store data for use by system 100, consistent with disclosed embodiments. In some embodiments, database may be configured to store datasets and/or one or more dataset indexes, consistent with disclosed embodiments. Database 106 may include a cloud-based database (e.g., AMAZON WEB SERVICES RELATIONAL DATABASE SERVICE) or an on-premises database. Database 106 may include datasets, model data (e.g., model parameters, training criteria, performance metrics, etc.), and/or other data, consistent with disclosed embodiments. Database 106 may include data received from one or more components of system 100 and/or computing components outside system 100 (e.g., via network 110). In some embodiments, database 106 may be a component of data-management system 102 (not shown).

Third-party system 108 may include at least one memory and one or more processors configured to perform operations consistent with disclosed embodiments. In some embodiments, third-party system 108 may be or include a virtual private cloud, a local computing environment (e.g., a personal computer, terminal, kiosk, or workstation), a server, a server cluster, a device (e.g., a mobile device, a tablet, a laptop, etc.), and/or any other computing system. In some embodiments, third-party system 108 may be unconnected to other computing systems of system 100 except via network 110.

Third-party system 108 may provide data to data-management system. For example, third-party system 108 may provide training data to data-management system 102 and/or a machine learning model, consistent with disclosed embodiments. As an example, third-party system 108 may transmit time series data, music data in an audio format, musical composition data, financial data, demographic data, health data, environmental data, education data, governmental data, and/or any other kind of data. In some embodiments, third-party system 108 provides data to data-management system via a subscription, a feed, a socket, or the like. In some embodiments, third-party system 108 sends a request to third-party system to retrieve data. In some embodiments, third-party system 108 sends a request for correlated synthetic data and/or one or more models configured to generate correlated synthetic data to data-management system.

At least one of data-management system 102, client device 104, a database 106, or third-party system client device 108 may be connected to network 110. Network 110 may be a public network or private network and may include, for example, a wired or wireless network, including, without limitation, a Local Area Network, a Wide Area Network, a Metropolitan Area Network, an IEEE-standard-compliant wireless network (e.g., "Wi-Fi"), a network of networks (e.g., the Internet), a land-line telephone network, or the like. Network 110 may be connected to other networks (not depicted in FIG. 1) to connect the various system components to each other and/or to external systems or devices. In some embodiments, network 110 may be a secure network and require a password to access the network.

Figure 2A:
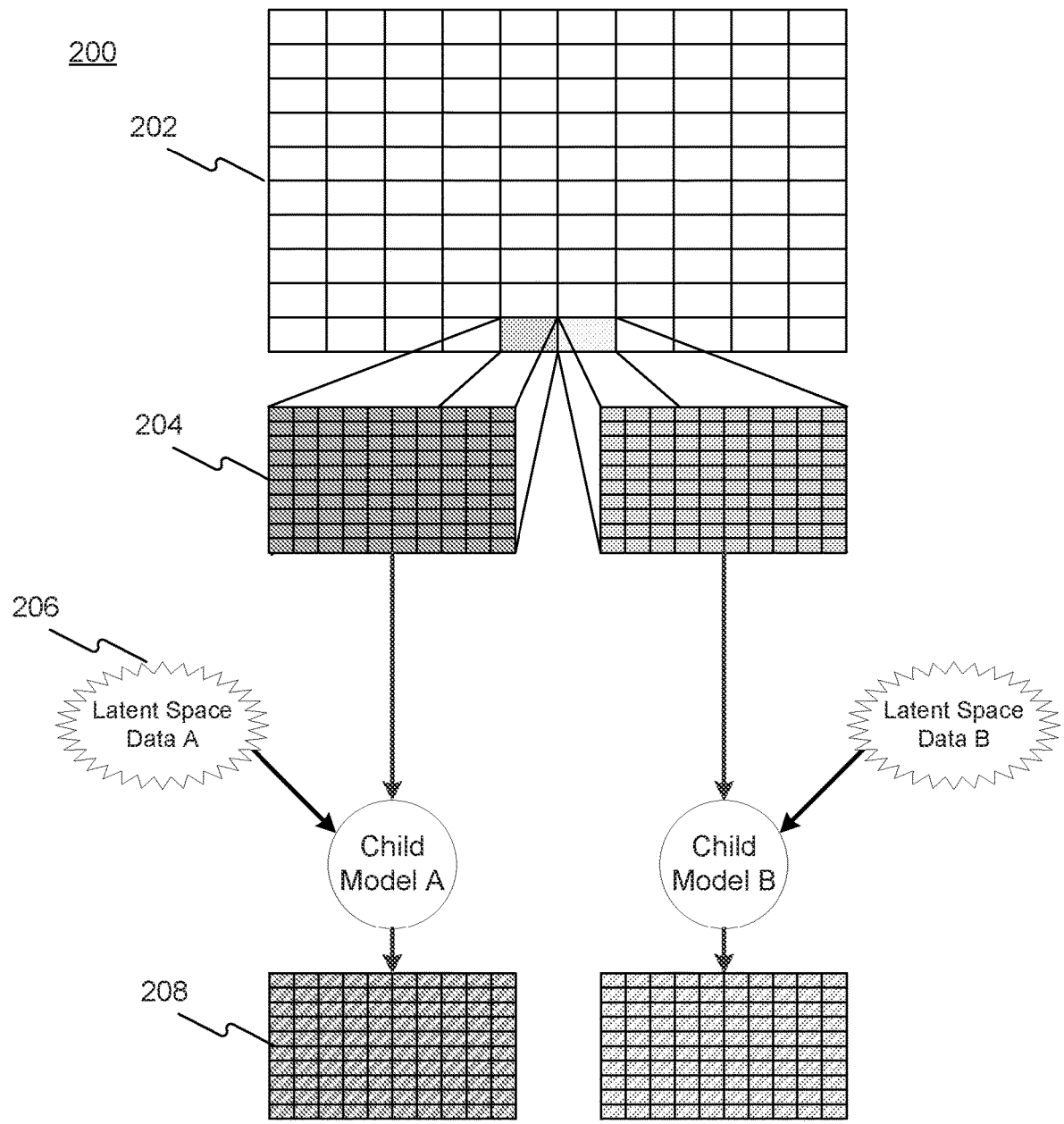
FIG. 2A illustrates a method of training a plurality of child models to generate synthetic data, consistent with disclosed embodiments.

FIG. 2A illustrates a method 200 of training a plurality of child models to generate synthetic data, consistent with disclosed embodiments. In some embodiments, data-management system 102 performs steps of process 200. It should be noted that other components of system 100, including, for example, client device 104 and/or third-party system 108 may perform operations of one or more steps of process 200. Process 200 may include training models according to architecture 300, architecture 302, architecture 304, and/or any other architecture consistent with disclosed embodiments.

In some embodiments, process 200 is performed to train one or more child models to generate synthetic dataset that is similar to an original dataset, as described in greater detail below. For example, a plurality of original intercorrelated datasets may include audio data associated with respective instruments in an orchestra playing a song (i.e., "audio tracks"), including a violin dataset, a cello dataset, a flute dataset, etc. In the example, process 200 may be performed to generate synthetic audio data for a synthetic orchestra (e.g., datasets comprising synthetic violin audio data, synthetic cello audio data, and synthetic flute audio data, etc.). For example, a child violin model may be trained on a violin dataset to generate synthetic violin audio data, a child cello model may be trained on a cello dataset to generate synthetic cello audio data, and a child flute model may be trained on a flute dataset to generate synthetic flute audio data, etc. In this way, child models may be trained to generate audio tracks that may sound realistic to a human. In some embodiments, a parent model may be trained to generate latent space data that, when received as inputs by a plurality of child models, generates intercorrelated datasets such as synthetic audio data for a synthetic orchestra. It should be noted that, in embodiments consistent with the present disclosure, process 200 may be performed to generate other types of synthetic data, and embodiments are not limited to the particular examples described herein.

For example, in some embodiments, process 200 may include child model output that may include a column of data related to states (state data). Another child model output may include a data column related to cities (city data). A parent model may be trained to reproduce correlations between state data and city data. A parent model output may include a vector of floating-point numbers, for example, which may be passed as input to the child models (i.e., latent space data). In the example, the input to the parent model may also be a vector of floating-point numbers.

At step 202, data-management system 102 receives a plurality of intercorrelated datasets, consistent with disclosed embodiments. In the example of FIG. 2A, individual datasets of the intercorrelated datasets are represented by boxes at step 202, including a dark-gray box, light-gray box, and a plurality of white boxes. Consistent with the present disclosure, intercorrelated datasets of step 202 may be referred to as training data used to train child models.

An intercorrelated dataset may have a statistical relationship with one or more other intercorrelated datasets, the statistical relationship satisfying a threshold criterion. A statistical relationship may include a correlation metric such as a covariance, a correlation coefficient, a rank correlation coefficient, an odds ratio, a covariance measure, a distance correlation, a randomized dependence coefficient, a regression coefficient, and/or any other correlation metric. For example, two intercorrelated datasets may have a Pearson's correlation coefficient greater than 0.6 or another threshold value.

By way of example, individual ones of the intercorrelated datasets may include data representing a musical score for individual instruments that is to be played simultaneously. That is, a first, second, and third intercorrelated dataset may include data representing a jazz piano score, a bass score, and drum score, respectively, wherein the jazz piano score, bass score, and drum score are part of a musical transcription of a jazz trio playing a jazz standard song. As another example, individual ones of the intercorrelated datasets may include data representing transactions made by individuals that share a demographic characteristic (e.g., transactions by classmates at a university). As yet another example, a first, second, and third intercorrelated dataset may include spatial temperature data, spatial ozone data, and spatial traffic data associated with a city. More generally, individual ones of the intercorrelated datasets may include time series data, spatial data, music data in an audio format, musical composition data, financial data, demographic data, health data, environmental data, education data, governmental data, and/or any other kind of data. In some embodiments, the intercorrelated datasets includes sensitive or confidential data, such as social security numbers, account numbers, medical test results, etc. As one of skill in the art will appreciate, the examples provided herein are not limiting on the embodiments, and an intercorrelated dataset may comprise other data not specifically identified herein.

In some embodiments, a subset of an intercorrelated dataset may have a statistical relationship with another intercorrelated dataset and/or with a subset of another intercorrelated dataset. For example, intercorrelated datasets may comprise a respective plurality of data columns, the data columns being subsets of their respective intercorrelated datasets. A first intercorrelated dataset may include a first data column, and a second intercorrelated dataset may include a second data column. In the example, a regression of the first column data column and second data column may satisfy a threshold criterion.

In embodiments consistent with the present disclosure, an intercorrelated dataset may have a data profile including a data schema and/or a statistical profile of a dataset. A statistical profile may include a statistical distribution, a noise factor, a moment (e.g., a mean), a variance, and/or any other statistical metric of a dataset. In some embodiments, data of an intercorrelated dataset may have internal correlations (i.e., an intercorrelated dataset may be intra-correlated). Generally, data of an intra-correlated dataset may have a statistical relationship satisfying a threshold criterion. For example, an intercorrelated dataset may comprise time series data that has an autocorrelation coefficient which satisfies a criterion. As another example, an intra-correlated dataset may comprise data representing the pitch and timing of musical notes in a musical score for an instrument, and data of intra-correlated dataset may have internal correlations based on the key signature, chord structure, melodic motifs, and rhythmic patterns within the musical score.

An intercorrelated dataset may have a data schema, including a data type, key-value pair, label, metadata, field, relationship, view, index, package, procedure, function, trigger, sequence, synonym, link, directory, queue, or the like. Intercorrelated datasets of the embodiments may contain foreign keys, i.e., data elements that appear in multiple datasets and may be used to cross-reference data and determine relationships between intercorrelated datasets. Foreign keys may be unique (e.g., a personal identifier such as a social security number) or shared (e.g., a postal code). Intercorrelated datasets of the embodiments may be "clustered," i.e., a group of datasets may share common features, such as overlapping data, shared statistical properties, etc. Clustered datasets may share hierarchical relationships (i.e., data lineage).

At step 202, some or all of the intercorrelated datasets may be received as part of a larger dataset as represented by the large box of step 202, consistent with disclosed embodiments. Alternatively or additionally, in some embodiments, individual ones of the intercorrelated datasets may be separate datasets received from different data sources. Step 202 may include receiving a plurality of intercorrelated datasets from one or more data sources. A data source may include a memory (e.g., a memory of data-management system 102, a memory of a device connected to data-management system 102), client device 104, database 106, third-party system 108, a computing resource accessed via the internet, and/or any other data source.

At step 204, data-management system 102 extracts (i.e., retrieves or receives) individual ones of the plurality of intercorrelated datasets to pass to machine learning models (e.g., child model A and child model B), consistent with disclosed embodiments. In some embodiments, step 204 includes data processing. For example, step 204 may include transforming data to reduce the dimensionality of an intercorrelated dataset, such as, for example, a principal component analysis (PCA) that generates PCA data, an independent component analysis (ICA) that generates ICA data, a non-negative matrix factorization (NMF) method, and/or an machine-learning based autoencoder model.

At step 206, data-management system 102 may provide latent-space data and extracted intercorrelated-datasets to respective child models, consistent with disclosed embodiments. Latent-space data may refer to any data that may be accepted as an input to a child model (e.g., a vector of floating-point numbers). Latent-space data may include noise data, randomized data, sensor data, and/or any other type of data. In some embodiments, latent-space data may include an intercorrelated dataset or data based on an intercorrelated dataset (e.g., latent-space data may include data generated by data processing at step 204, such as PCA data, ICA data, etc.). In some embodiments, step 206 may include generating latent-space data. In some embodiments, processing data may include encoding data, as described in greater detail below.

As shown in the illustration of FIG. 2A, data-management system 102 may provide respective latent-space data to a child model A and a child model B. A child model may include a GAN model, a neural network model, a recurrent neural network (RNN) model, a convolutional neural network (CNN) model, a random forest model, an autoencoder model, a variational autoencoder model, and/or any other machine learning model. A child model may include a synthetic data model (i.e., a model configured to generate synthetic data). As one of skill in the art will appreciate, step 206 may involve a different number of child models than the two depicted in FIG. 2A.

At step 208, data-management system 102 may train a plurality of child models to generate synthetic data based on latent-space data, consistent with disclosed embodiments. For example, in the illustration of FIG. 2A, synthetic data are represented by boxes with diagonal shading at step 208, and latent-space data are represented by the many-pointed stars labelled as latent-space data A and latent-space data B.

Data-management system 102 may train a child model to generate synthetic data with a statistical similarity to original data according to a similarity metric, consistent with disclosed embodiments. Original data may include received intercorrelated datasets, represented by boxes with solid gray shading at step 204. For example, a child model may include a GAN model, and a discriminator of the GAN model may evaluate a statistical similarity metric.

In some embodiments, training of a child model may terminate when a performance criterion (i.e., training criterion) is satisfied. A training criterion may include a number of epochs, a training time, a performance metric (e.g., an estimate of accuracy in reproducing test data), or the like. Data-management system 102 may be configured to adjust model parameters during training. Model parameters may include weights, coefficients, offsets, or the like. A training criterion may be based on a similarity metric representing a measure of similarity between a synthetic dataset and an original dataset. A similarity metric may be based on a correlation, covariance matrix, a variance, a frequency of overlapping values, or other measure of statistical similarity. Training may include hyperparameter tuning. Training may be supervised or unsupervised.

Figure 2B:
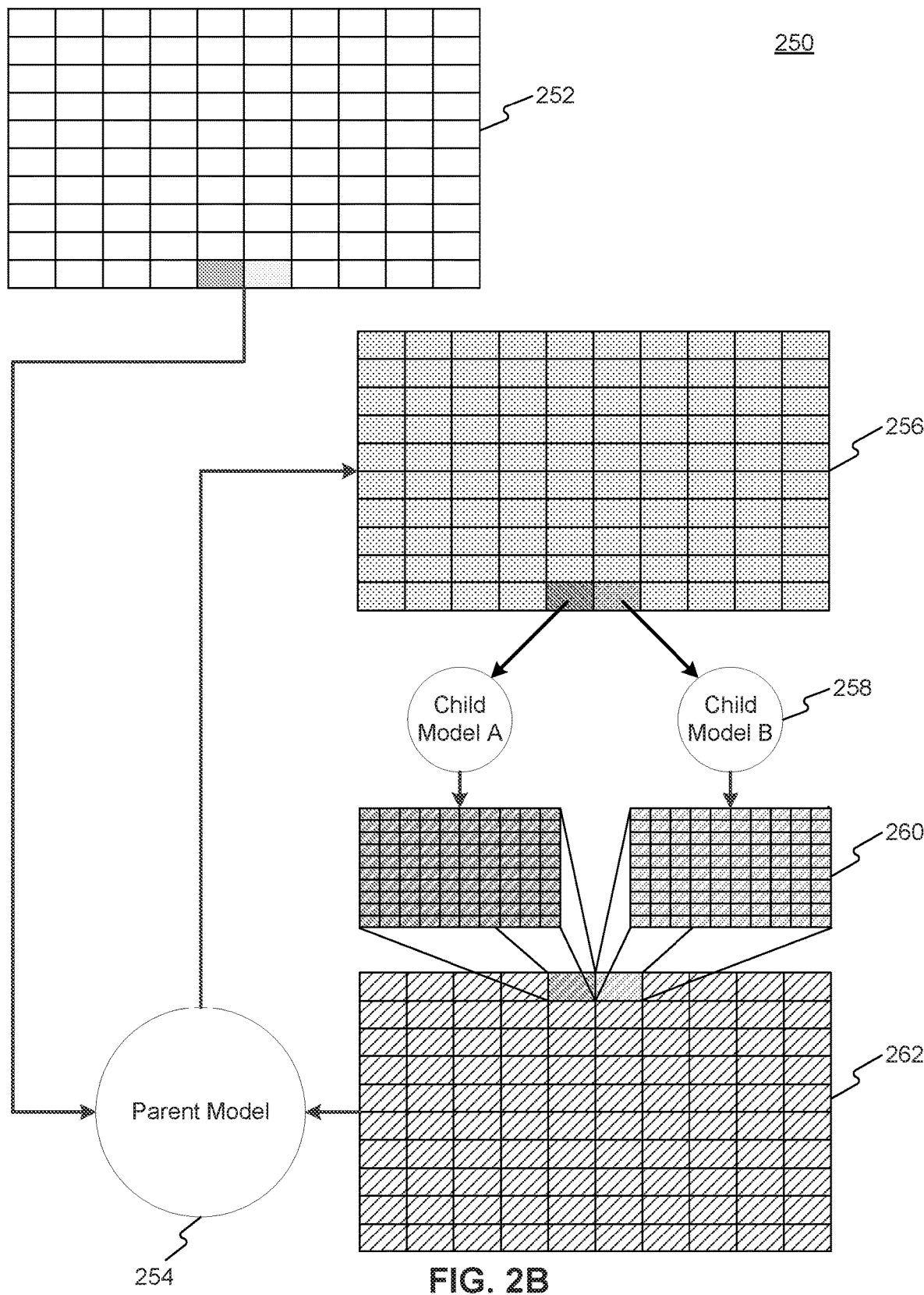
FIG. 2B illustrates a method of training a parent model to generate intercorrelated synthetic data, consistent with disclosed embodiments.

FIG. 2B illustrates a method 250 of training a parent model to generate intercorrelated synthetic data, consistent with disclosed embodiments. In some embodiments, data-management system 102 performs steps of process 200. It should be noted that other components of system 100, including, for example, client device 104 and/or third-party system 108 may perform operations of one or more steps of process 200. Process 250 may include training models according to architecture 300, architecture 302, architecture 304, and/or any other architecture consistent with disclosed embodiments.

In some embodiments, data-management system 102 performs process 250 as a continuation of process 200. For example, process 200 may train a plurality of child models configured to generate synthetic datasets that are similar to respective original datasets according to a similarity metric, consistent with disclosed embodiments. But, in some embodiments, a plurality of child models trained using process 200 may generate synthetic datasets which may be weakly intercorrelated with each other. Accordingly, process 250 may be performed to improve the intercorrelations between synthetic datasets generated by child models.

As an illustrative example, process 200 may train a plurality of child models to generate synthetic audio tracks for respective instruments which, to a human, individually sound like songs played by real instruments. But the synthetic audio tracks have weak intercorrelations (e.g., the plurality of synthetic audio tracks may sound like different songs, a song in different keys, or a song at different tempos, etc.). Accordingly, process 250 may be performed to improve intercorrelations between synthetic audio tracks. In this way, synthetic audio tracks generated by models trained using process 250 may sound like instruments playing the same song such as an orchestra playing a symphony. Although this example illustrates process 250 for synthetic audio data, it should be noted that processes 200 and 250 may involve any other type of synthetic data (e.g., financial data, demographic data, and/or any other type of data).

At step 252, data-management system 102 receives a plurality of intercorrelated datasets, consistent with disclosed embodiments. In the example of FIG. 2B, individual datasets of the intercorrelated datasets are represented by boxes at step 252, including a dark-gray box, light-gray box, and a plurality of white boxes. Consistent with the present disclosure, intercorrelated datasets of step 252 may be referred to as training data used to train a parent model.

At step 254, data-management system 102 may provide a plurality of intercorrelated datasets to a parent model, consistent with disclosed embodiments. Step 254 may include data processing prior to providing a dataset to a parent model by, for example, transforming a dataset and/or encoding a dataset, consistent with disclosed embodiments.

A parent model may include a GAN model, a neural network model, an RNN model, a CNN model, a random forest model, an autoencoder model, a variational autoencoder model, a clustering model, and/or any other machine learning model. In some embodiments, a parent model may be configured to be trained to identify data clusters of intercorrelated datasets. Data clusters may include a set of classifications and relationships between datasets (e.g., node-edge relationships, hierarchical relationships, data lineage, etc.).

At step 256, a parent model may generate latent-space data, consistent with disclosed embodiments. Consistent with the present disclosure, latent-space data may refer to any data output by a parent model, and latent-space data may be in a different format from an intercorrelated dataset. For example, latent space data may comprise a vector of digits that have a different data schema from a training dataset (e.g., audio data). In some embodiments, a parent model accepts noise data or other randomized input data as input and generates output comprising latent-space data. In some embodiments, a parent model accepts one or more intercorrelated datasets as input and generates output comprising latent-space data. In some embodiments, a parent model may generate a plurality of latent-space datasets corresponding to a plurality of received intercorrelated datasets. For example, a parent model may generate first latent-space data corresponding to a first intercorrelated dataset and second latent-space data corresponding to a second intercorrelated dataset, etc. In the illustration of FIG. 2B latent-space data corresponding to the plurality of interconnected datasets are represented by the dotted boxes of step 256, including a dark gray dotted and light gray dotted box corresponding to a dark gray box and light gray box depicted in step 252.

At step 258, data-management system 102 may provide latent-space data to a plurality of child models, consistent with disclosed embodiments. A child model may include a child model trained according to process 200. In the example of FIG. 2B, data-management system 102 may provide first latent-space data corresponding to a first intercorrelated dataset (dark gray box with dots) to child model A, and data-management system 102 may provide second latent-space data corresponding to a second intercorrelated dataset (dark gray box with dots) to child model B. As one of skill in the art will appreciate, step 258 may include providing latent-space data to a different number of child models than the two depicted in FIG. 2B. In some embodiments, the latent-space data provided to one or more child models partially or wholly overlaps (i.e., shares some or all data elements).

In some embodiments, a child model may be an instance of a template child model (e.g., a child model may be an instance of a violin model, and a plurality of violin models may be used during training of a parent model to simulate an orchestra). In some embodiments, child models include instances of a template model trained on respective subsets of training data, resulting in minor but characteristic variations between one instance (e.g., to give different models of soprano singers different synthetic voices so that they sound like different people).

At step 260, one or more child models may generate respective synthetic datasets based on latent-space data, consistent with disclosed embodiments. For example, step 260 may include generating, using a first child model, first synthetic data based on first latent-space data and generating, using a second child model, a second synthetic dataset. Synthetic datasets may include any type of synthetic dataset as described herein (e.g., synthetic audio tracks). In some embodiments, the latent-space data used by one or more child models partially or wholly overlaps (i.e., shares some or all data elements).

At step 262, data-management system may compare synthetic datasets to received intercorrelated datasets and, based on the comparison, continues to train a parent model or terminates training of the parent model. For example, data-management system 102 may determine whether a test correlation metric of synthetic audio tracks is similar to a reference correlation metric of received audio tracks, where data-management system 102 determines a similarity metric (e.g., to determine a degree of similarity between a test correlation metric and a reference correlation metric. As shown in FIG. 2B, steps 254 to 262 may be repeated iteratively until data-management system 102 terminates parent model training. For example, data-management system 102 may iterate steps of process 250 until a parent model generates latent-space data that, when provided to child models, results in synthetic audio tracks that sound like instruments playing the same song such as an orchestra playing a symphony.

Referring to step 262 in greater detail, step 262 may include comparing synthetic data to training data. Training a parent model may include adjusting a parameter of the parent model (e.g., a coefficient, a weight, or the like), consistent with disclosed embodiments. For example, data-management system 102 may compare first synthetic data generated by a first child model and second synthetic data generated by a first child model. In some embodiments, a parent model includes a GAN model, and step 262 comprises evaluating correlations of synthetic data using a discriminator of the GAN model. In some embodiments, a parent model includes a clustering model trained to map clusters of latent space data. For example, a clustering model may be trained to determine that, if a parent model generates a "3" as an input to first child model, a second child model needs a "1" as an input to create a correlated input.

In some embodiments, comparing synthetic data to training data may comprise comparing a test correlation metric associated with synthetic datasets to a reference correlation metric associated with training data. For example, a correlation metric may include a correlation coefficient, a rank correlation coefficient, an odds ratio, a covariance measure, a distance correlation, a randomized dependence coefficient, a regression coefficient, and/or any other correlation metric. As an example, a test correlation metric may include a covariance measure of the synthetic datasets, and a reference correlation metric may include a covariance measure of received intercorrelated datasets.

In some embodiments, step 262 may include determining a plurality of test correlation metrics based on synthetic datasets and/or determining a plurality of reference correlation metrics based on received intercorrelated datasets. Step 262 may include comparing a plurality of test correlation metrics to a plurality of reference correlation metrics and, based on the comparison, continues to train a parent model or terminate training of the parent model.

As one of skill in the art will appreciate, processes 200 and 250 may be performed consecutively and/or simultaneously. For example, training of a child model may be performed when training a parent model. Alternatively or additionally, training of a child model may precede training of a parent model.

Figure 3:
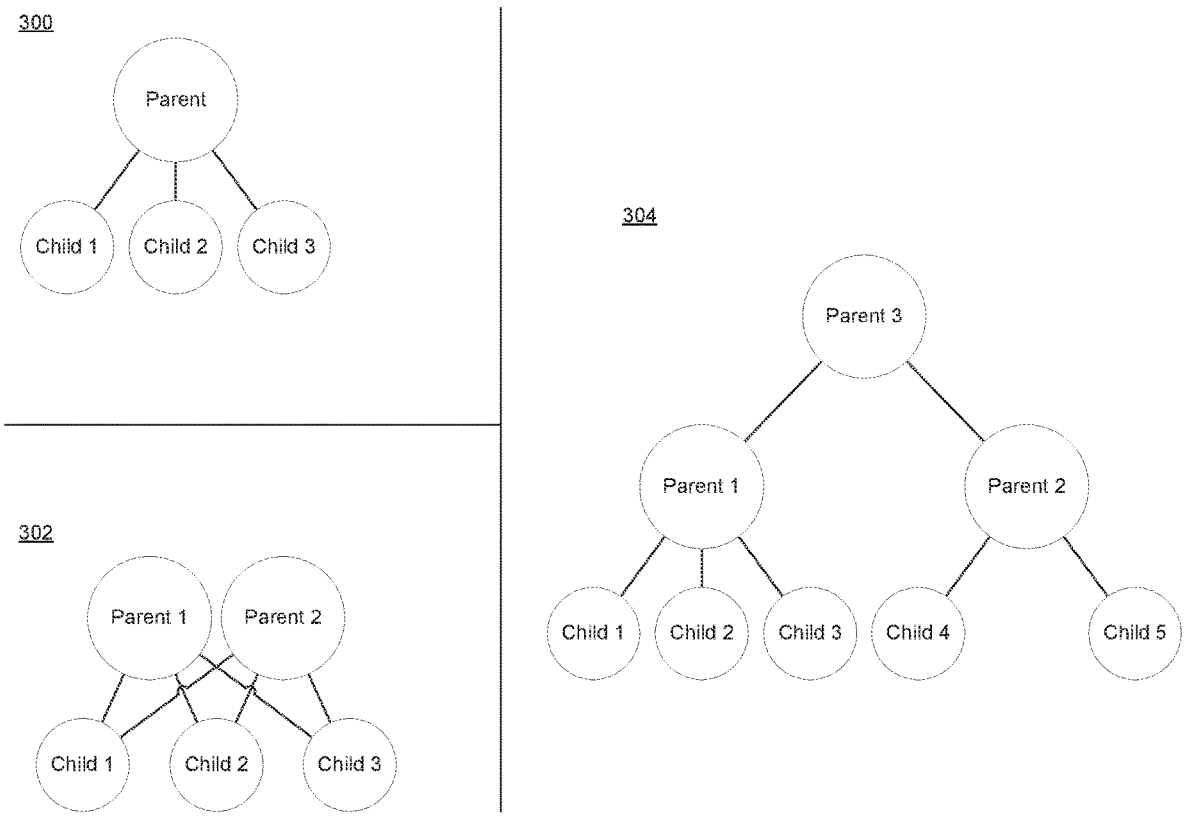
FIG. 3 illustrates various exemplary modeling architectures, consistent with disclosed embodiments.

FIG. 3 illustrates various exemplary modeling architectures, including architectures 300, 302, and 304, consistent with disclosed embodiments. Architectures of FIG. 3 are provided for purposes of illustration only and are not limiting on the embodiments. It should be understood that the embodiments may include other architectures not depicted in FIG. 3. For example, although architectures of FIG. 3 may depict a certain number and arrangement of child models and parent models, it should be understood that embodiments consistent with the present disclosure may include architectures with any number of child and parent models and any arrangement of child and parent models.

In exemplary architecture 300, a plurality of child models may be associated with a parent model. In some embodiments, the child models and the parent model of architecture 300 may be trained as described in reference to process 200 and process 250.

As another example, exemplary architecture 302 includes a plurality of child models (i.e., child 1, child 2, and child 3) associated with two parent models (i.e., parent 1 and parent 2), consistent with disclosed embodiments. In the example, child models may be trained according to process 200, and parent 1 and parent 2 may be trained according to process 250. In some embodiments, parent 1 and parent 2 may be trained simultaneously to generate respective latent-space data that, when provided to a child model, allows a child model to generate synthetic datasets similar to training data, consistent with disclosed embodiments.

As an illustrative example of architecture 302, parent model 1 may be configured to generate latent-space-data comprising synthetic price data for a product (i.e., "supply data"). Parent model 2 may be configured to generate latent-space-data comprising synthetic income data associated with a plurality of consumers and social network data associated with the plurality of consumers (i.e., "demand data"). In the example, child models may correspond to the plurality of consumers. Child models may be configured to generate synthetic transaction data associated with their respective consumers based on supply data of parent 1 and demand data of parent 2.

As yet another exemplary architecture, architecture 304 may include more than one layer of parent models. In the example, child 1, child 2, and child 3 may be associated with parent 1; child 4 and child 5 may be associated with parent 2; and parent 1 and parent 2 may be associated with parent 3. In some embodiments of architecture 304, parent 3 may be configured to generate data associated with a state; parents 1 and 2 may be configured to generate data associated with respective counties within the state; child models 1-3 may be configured to generate synthetic data associated with respective towns within the county of parent 1; and child models 4-5 may be configured to generate synthetic data associated with respective towns within the county of parent 2.

Figure 4:
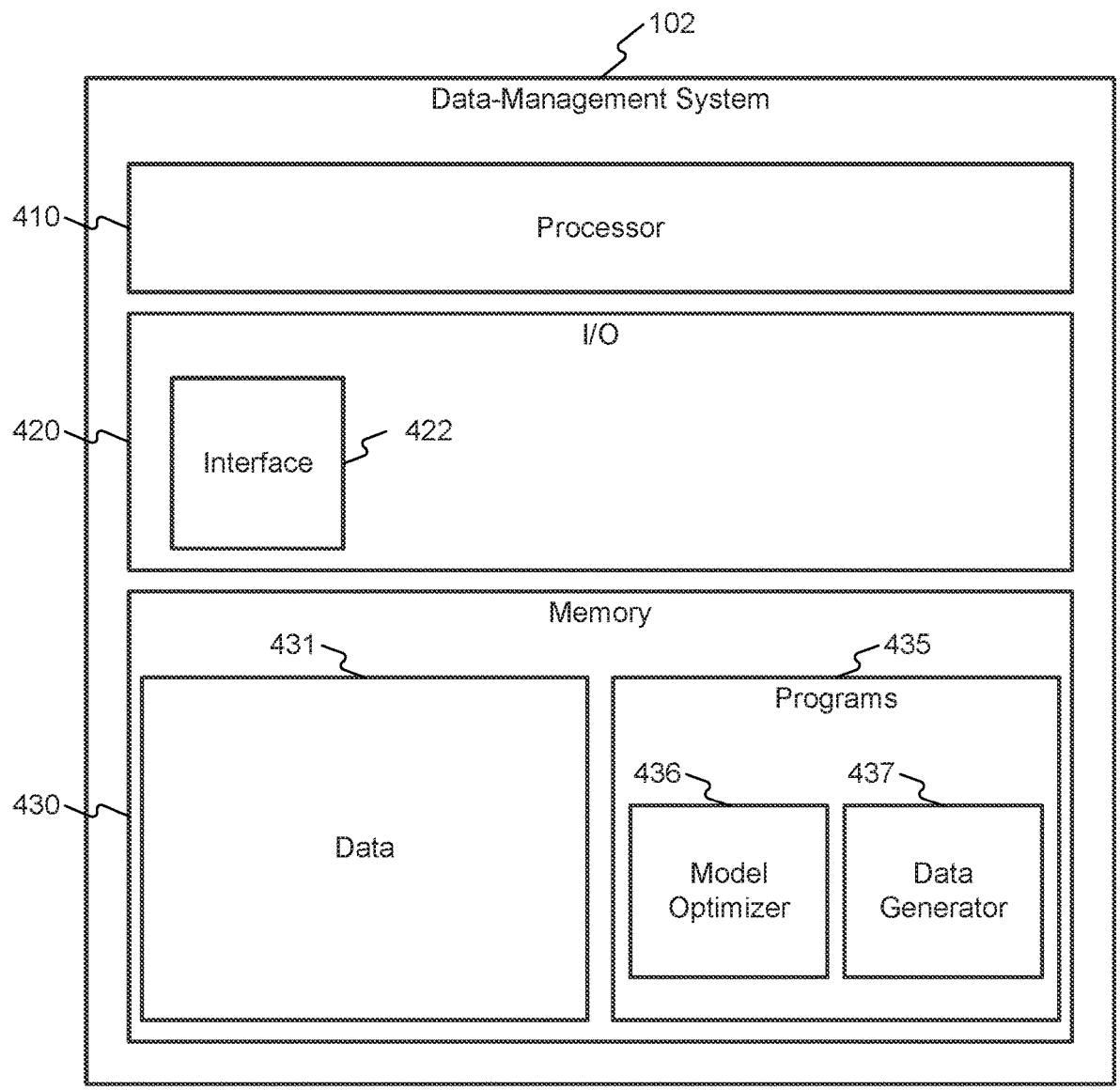
FIG. 4 is a block diagram of an exemplary data management system, consistent with disclosed embodiments.

FIG. 4 is a block diagram of an exemplary data-management system 102, consistent with disclosed embodiments. As will be appreciated by one skilled in the art, the components and arrangement of components included in data-management system 102 may vary. For example, as compared to the depiction in FIG. 4, data-management system 102 may include a larger or smaller number of processors, I/O devices, or memory units. In addition, data-management system 102 may further include other components or devices not depicted that perform or assist in the performance of one or more processes consistent with the disclosed embodiments. The components and arrangements shown in FIG. 4 are not intended to limit the disclosed embodiments, as the components used to implement the disclosed processes and features may vary.

Processor 410 may comprise known computing processors, including a microprocessor. Processor 410 may constitute a single-core or multiple-core processor that executes parallel processes simultaneously. For example, processor 410 may be a single-core processor configured with virtual processing technologies. In some embodiments, processor 410 may use logical processors to simultaneously execute and control multiple processes. Processor 410 may implement virtual machine technologies, or other known technologies to provide the ability to execute, control, run, manipulate, store, etc., multiple software processes, applications, programs, etc. In another embodiment, processor 410 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 410 may execute various instructions stored in memory 430 to perform various functions of the disclosed embodiments described in greater detail below. Processor 410 may be configured to execute functions written in one or more known programming languages.

I/O devices 420 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments. I/O devices 420 may be components of an interface 422 (e.g., a user interface).

Interface 422 may be configured to manage interactions between system 100 and other systems using network 110. In some aspects, interface 422 may be configured to publish data received from other components of system 100. This data may be published in a publication and subscription framework (e.g., using APACHE KAFKA), through a network socket, in response to queries from other systems, or using other known methods. Data may be synthetic data, as described herein. As an additional example, interface 422 may be configured to provide information received from other components of system 100 regarding datasets. In various aspects, interface 422 may be configured to provide data or instructions received from other systems to components of system 100. For example, interface 422 may be configured to receive instructions for generating data models (e.g., type of data model, data model parameters, training data indicators, training parameters, or the like) from another system and provide this information to programs 435. As an additional example, interface 422 may be configured to receive data including sensitive data from another system (e.g., in a file, a message in a publication and subscription framework, a network socket, or the like) and provide that data to programs 435 or store that data in, for example, data 431 and/or database 106.

In some embodiments, interface 422 may include a user interface configured to receive user inputs and provide data to a user (e.g., a data manager). For example, interface 422 may include a display, a microphone, a speaker, a keyboard, a mouse, a track pad, a button, a dial, a knob, a printer, a light, an LED, a haptic feedback device, a touchscreen and/or other input or output devices.

Memory 430 may be a volatile or non-volatile, magnetic, semiconductor, optical, removable, non-removable, or other type of storage device or tangible (i.e., non-transitory) computer-readable medium, consistent with disclosed embodiments. As shown, memory 430 may include data 431, including one of at least one of encrypted data or unencrypted data. Consistent with disclosed embodiments, data 431 may include datasets, model data (e.g., model parameters, training criteria, performance metrics, etc.), and/or other data.

Data 431 may store intercorrelated datasets, consistent with disclosed embodiments. In some embodiments, data 431 may include a data index associated with one or more datasets, consistent with disclosed embodiments. Data 431 may store data models (e.g., machine-learning models and/or statistical models) and descriptive information of data models. Data 431 may include model information, such as the type and/or purpose of a model and any measures of classification error. Data 431 may include indexed and clustered models for use by data-management system 102. For example, data 431 may store models associated with generalized representations of those models (e.g., neural network architectures stored in TENSORFLOW and/or other standardized formats).

Programs 435 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 435 may be written in one or more programming or scripting languages. One or more of such software sections or modules of memory 430 may be integrated into a computer system, non-transitory computer-readable media, or existing communications software. Programs 435 may also be implemented or replicated as firmware or circuit logic.

Programs 435 may include a model optimizer 436, a data generator 437, and/or other components (e.g., modules) not depicted to perform methods of the disclosed embodiments. In some embodiments, modules of programs 435 may be configured to generate ("spin up") one or more ephemeral container instances (e.g., an AMAZON LAMBDA instance) to perform a task and/or to assign a task to a running (warm) container instance, consistent with disclosed embodiments. Modules of programs 435 may be configured to receive, retrieve, and/or generate models, consistent with disclosed embodiments. Modules of programs 435 may be configured to perform operations in coordination with one another. In some embodiments, programs 435 may be configured to conduct an authentication process, consistent with disclosed embodiments.

Model optimizer 436 may include programs (e.g., scripts, functions, algorithms) to train, implement, store, receive, retrieve, and/or transmit one or more machine-learning models. Model optimizer 436 may be configured to optimize models using standard computing language and platforms (e.g., TENSORFLOW). Machine-learning models may include a neural network model, an attention network model, a GAN model, an RNN model, a deep learning model (e.g., a long short-term memory (LSTM) model), a random forest model, a CNN model, an RNN-CNN model, an LSTM-CNN model, a temporal-CNN model, a support vector machine (SVM) model, a Density-based spatial clustering of applications with noise (DBSCAN) model, a k-means clustering model, a distribution-based clustering model, a k-medoids model, a natural-language model, and/or another machine-learning model. Models may include an ensemble model (i.e., a model comprised of a plurality of models). In some embodiments, training of a model may terminate when a training criterion is satisfied. A training criterion may include a number of epochs, a training time, a performance metric (e.g., an estimate of accuracy in reproducing test data), or the like. Model optimizer 436 may be configured to adjust model parameters during training. Model parameters may include weights, coefficients, offsets, or the like. Training may be supervised or unsupervised.

Model optimizer 436 may be configured to train machine learning models by optimizing model parameters and/or hyperparameters (i.e., hyperparameter tuning) using an optimization technique, consistent with disclosed embodiments. Hyperparameters may include training hyperparameters, which may affect how training of a model occurs, or architectural hyperparameters, which may affect the structure of a model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. Model optimizer 436 may be configured to optimize statistical models using known optimization techniques.

In some embodiments, model optimizer 436 may be configured to generate models based on instructions received from another component of system 100 and/or a computing component outside system 100 (e.g., via interface 422, from client device 104, etc.). For example, model optimizer 436 may be configured to receive a visual (e.g., graphical) depiction of a machine learning model and parse that graphical depiction into instructions for creating and training a corresponding neural network. Model optimizer 436 may be configured to select model training parameters. This selection can be based on model performance feedback received from another component of system 100. Model optimizer 436 may be configured to provide trained models and descriptive information concerning the trained models to model storage 104.

Model optimizer 436 may be configured to train data models to generate synthetic data based on an input dataset (e.g., a dataset comprising actual data). For example, model optimizer 436 may be configured to train data models to generate synthetic data by identifying and replacing sensitive information in a dataset. In some embodiments, model optimizer 436 may be configured to train data models to generate synthetic data based on a data profile (e.g., a data schema and/or a statistical profile of a dataset). For example, model optimizer 436 may be configured to train data models to generate synthetic data to satisfy a performance criterion. Performance criteria may be based on a similarity metric representing a measure of similarity between a synthetic dataset and another dataset.

Data generator 437 may include programs configured to generate synthetic data, consistent with disclosed embodiments. As described herein, data generator 437 may include a parent model and child model. Consistent with disclosed embodiments, data generator 437 may include algorithms and/or models to generate a data profile, to classify data, to cluster data, and/or to encode data.

Data generator 437 may include one or more parent models and one or more child models, consistent with disclosed embodiments. A child model and/or parent model may include a GAN model, a neural network model, an RNN model, a CNN model, a random forest model, an autoencoder model, a variational autoencoder model, a clustering model, and/or any other machine learning model.

Data generator 437 may include algorithms and/or models to generate a data profile. A data profile may comprise a data schema of a dataset and/or a statistical profile of a dataset, consistent with disclosed embodiments. Data generator 437 may include or be configured to train and/or implement one or more data-profiling models. A data-profiling model may include machine-learning models and statistical models to determine a data schema and/or a statistical profile of a dataset (i.e., to profile a dataset), consistent with disclosed embodiments. A data-profiling model may include an RNN model, a CNN model, and/or other machine-learning model.

Data generator 437 may include algorithms to identify a data schema. For example, data generator 437 may include algorithms to determine a data type, key-value pairs, row-column data structure, statistical distributions of information such as keys or values, and/or any other property of a data schema.

Data generator 437 may be configured to generate a statistical profile of a dataset). In some embodiments, data generator 437 may be configured to implement univariate and multivariate statistical methods. Data generator 437 may include a regression model, a Bayesian model, a statistical model, a linear discriminant analysis model, or other classification model configured to determine one or more descriptive metrics of a dataset. For example, data generator 437 may include algorithms to determine an average, a mean, a standard deviation, a quantile, a quartile, a probability distribution function, a range, a moment, a variance, a covariance, a covariance matrix, a frequency of overlapping values, a dimension and/or dimensional relationship (e.g., as produced by dimensional analysis such as length, time, mass, etc.) or any other descriptive metric of a dataset. Data generator 437 may be configured to generate a similarity metric representing a measure of similarity between two or more datasets.

Data generator 437 may include algorithms and/or models configured to classify data. Classifying data may include determining whether a data sample is related to another data sample. Classifying a dataset may include estimating a likelihood that a dataset relates to another dataset, the likelihood being based on the similarity metric. Classifying data may including tagging or otherwise labelling data. Classifying a dataset may include generating data organizing and/or describing a dataset (e.g., a dataset index).

Data generator 437 may include algorithms and/or models configured to cluster data. For example, data generator 437 may include algorithms and/or models comprising a k-means algorithm, a k-medoids algorithm, an elbow method, an X-means clustering method, an information criterion approach, a silhouette method, a cross-validation method, a method based on a kernel matrix, and/or any other method of clustering data. Data generator 437 may include a machine learning model configured to cluster data such as a deep learning model, a neural network model, an RNN, a CNN, a random forest model, a Support Vector Machine (SVM) model, a Density-based spatial clustering of applications with noise (DBSCAN) model, a k-means clustering model, a distribution-based clustering model, a k-medoids model, and/or any other type of machine learning model. Clustering data may include generating node and edge data. Edge data may be based on a similarity metric. Edge data may and indicate a similarity between datasets and/or a hierarchical relationship (e.g., a data lineage, a parent-child relationship). In some embodiments, clustering data may include generating graphical data, such as a node diagram, a tree diagram, or a vector diagram of datasets.

Data generator 437 may include algorithms and/or models to encode data. Encoding data may include a principal component analysis (PCA), an independent component analysis (ICA), a non-negative matrix factorization method (NMF), a Factor Analysis (FA), an autoencoder-model based analysis, and/or any other algorithm to reduce dimensionality of latent variable generated by a model. In some embodiments, data generator 437 may include programs to transform string data (e.g., character data or other non-numeric data) into numeric data (e.g., to transform letters, words, or other strings into numbers according to a table). Data generator 437 may be configured to perform methods of character encoding (e.g., one-hot encoding). In some embodiments, data generator 437 may be configured to receive, train, and/or implement a machine learning model configured for natural-language processing (i.e., a natural-language model). In some embodiments, data generator 437 may be configured to implement a natural-language model to encode string data as numeric data. For example, data generator 437 may transform words and/or phrases into numbers by applying a lexicon, a parser, and a grammar rule system. In some embodiments, data generator 437 may be configured to receive, train, and/or implement an autoencoder model or components of an autoencoder model (e.g., an encoder model or a decoder model). In some embodiments, data generator 437 may be configured to implement an autoencoder model to reduce the dimensionality of a dataset. Data generator 437 may be configured to tag classified and/or clustered data, consistent with disclosed embodiments.

Figure 5:
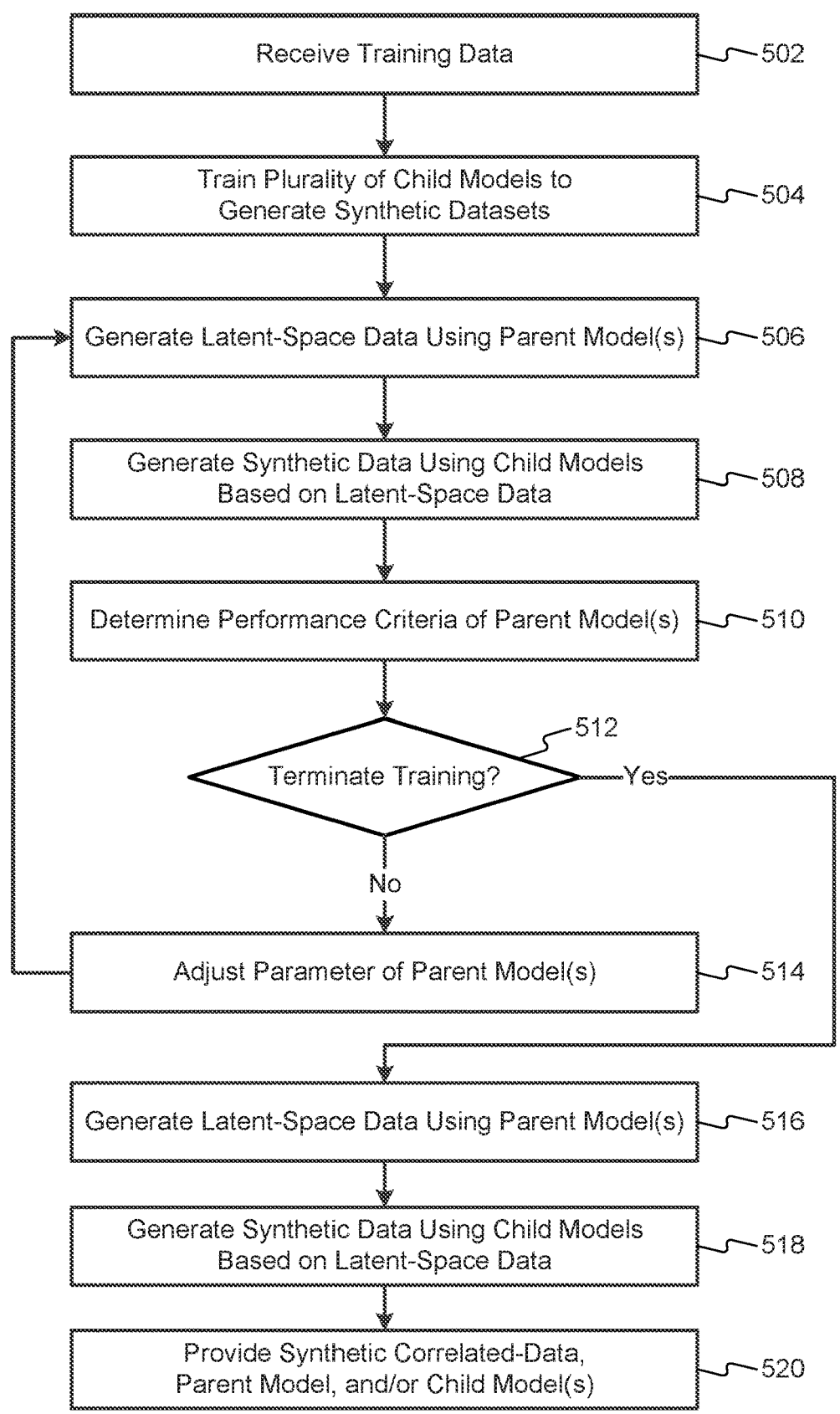
FIG. 5 is a flow chart of an exemplary process for training models to generate intercorrelated synthetic datasets, consistent with disclosed embodiments.

FIG. 5 is a flow chart of an exemplary process 500 for training models to generate intercorrelated synthetic datasets, consistent with disclosed embodiments. Process 500 may include training models according to architecture 300, architecture 302, architecture 304, and/or any other architecture consistent with disclosed embodiments.

In some embodiments, data-management system 102 may perform process 500 using programs 435. One or more of model optimizer 436, data-generator 437, and/or other components of programs 435 may perform operations of process 500, consistent with disclosed embodiments. It should be noted that other components of system 100, including, for example, client device 104 and/or third-party 108 may perform operations of one or more steps of process 500.

Consistent with disclosed embodiments, steps of process 500 may be performed on one or more cloud services using one or more ephemeral container instances (e.g., AMAZON LAMBDA). For example, at any of the steps of process 500, data-management system 102 may generate (spin up) an ephemeral container instance to execute a task, assign a task to an already-running ephemeral container instance (warm container instance), or terminate a container instance upon completion of a task. As one of skill in the art will appreciate, steps of process 500 may be performed as part of an application interface (API) call.

At step 502, data-management system 102 may receive training data, consistent with disclosed embodiments. Training data at step 502 may include intercorrelated datasets, as descried herein. In some embodiments, receiving training data at step 502 includes retrieving training data from memory (e.g., memory 430), receiving training data from a client device (e.g., client device 104), receiving or retrieving training data from a database (e.g., database 106), and/or receiving or retrieving training data from a remote system (e.g., third-party system 108).

At step 504, data-management system 102 may train a plurality of child models to generate synthetic datasets, consistent with disclosed embodiments. Step 504 may include performing some or all steps of process 200 (FIG. 2A). For example, step 504 may include training a plurality of child models to generate respective synthetic datasets according to a similarity metric between respective synthetic datasets and receive intercorrelated datasets.

At step 506, data-management system 102 may generate latent-space data using one or more parent models, consistent with disclosed embodiments. In some embodiments, latent-space data may correspond to an intercorrelated dataset, as previously described. Latent-space data may refer to any data output by a parent model, consistent with disclosed embodiments. Generating latent-space data using a parent model at step 508 may include providing input data to a parent model, the input data comprising noise data and/or intercorrelated dataset (e.g., as described in reference to step 256 of FIG. 2B).

At step 508, data-management system 102 may generate synthetic data using a plurality of child models based on latent-space data, consistent with disclosed embodiments. Step 508 may include methods as described in reference to step 208 (FIG. 2A). Step 508 may include implementing trained child models (e.g., child models trained at step 504).

In some embodiments, a child model may be an instance of a template child model (e.g., a child model may be an instance of a violin model, and a plurality of violin models may be used during training of a parent model to simulate an orchestra).

At step 510, data-management system 102 may determine one or more performance criteria of one or more parent models, consistent with disclosed embodiments. A performance criterion (i.e., training criterion), may include any criterion as described herein, such as a threshold criterion. In some embodiments, a performance criterion is based on a correlation metric such as a covariance, a correlation coefficient, a rank correlation coefficient, an odds ratio, a covariance measure, a distance correlation, a randomized dependence coefficient, a regression coefficient, and/or any other correlation metric. In some embodiments, a performance criterion is based on a similarity metric between a correlation metric associated with synthetic datasets (i.e., a measure of the correlations between synthetic datasets generated by child models) and a reference correlation metric (i.e., a measure of correlations between received intercorrelated datasets).

At step 512, data-management system 102 may determine whether to terminate training of one or more parent models based on one or more performance criteria of the one or more parent models, consistent with disclosed embodiments. For example, data-management system 102 may terminate training based on whether a performance criterion meets a threshold.

As shown in FIG. 5, if model training is not terminated at step 512, data-management system 102 may proceed to step 514 following step 512.

At step 514, data-management system 102 may adjust one or more parameters of one or more parent models, consistent with disclosed embodiments. Adjusting a parameter may including changing a weight, a coefficient, or the like, consistent with disclosed embodiments. In some embodiments, adjusting a parameter may include adjusting an architectural parameter (i.e., hyperparameter tuning) such as a number of layers, consistent with disclosed embodiments.

As shown in FIG. 5, after step 514, data-management system may repeat steps 506 to 512. That is, data-management system may iteratively perform steps of process 500 to optimize a parent model until the parent model can generate latent space data that a plurality of child models can use to generate synthetic datasets with correlations between synthetic datasets that are statistically similar to correlations of original data (i.e., received intercorrelated data).

As shown in FIG. 5, if model training is terminated at step 512, data-management system 102 may proceed to step 516 following step 512.

At step 516, data-management system 102 may generate latent-space data using one or more parent models, consistent with disclosed embodiments. Step 516 may include providing input data to a parent model and implementing a parent model to generate latent space data. As previously described, input data may include noise data and/or received intercorrelated datasets.

At step 518, data-management system 102 may generate synthetic data using child models based on latent-space data, consistent with disclosed embodiments. Step 518 may include providing latent space data to a child model and implementing a child model to generate a synthetic dataset. In some embodiments, a child model used at step 518 may be the same as a child model used during parent model training (step 508). In some embodiments, a child model used at step 518 may be a different model from the child models used during parent model training (step 508) (i.e., a substitute child model may be used at step 518). For example, a parent model may be trained using a plurality of child models corresponding to singers in a chorus at step 508, and the child models may be substituted at step 518 with child models corresponding to instruments in an orchestra such that the parent model may compose music for the orchestra with little or no retraining of the parent model. In some embodiments, a child model may be an instance of a template child model, consistent with disclosed embodiments. In some embodiments, step 518 includes combining synthetic datasets generated by child models (i.e., generating a combined dataset).

At step 520, data-management system 102 may provide synthetic correlated-data, a child model, and/or a parent model, consistent with disclosed embodiments. Providing synthetic correlated-data, a child model, and/or a parent model may include storing synthetic correlated-data, a child model, and/or a parent model in a data storage (e.g., memory 430 and/or database 106). Providing synthetic correlated-data, a child model, and/or a parent model may include transmitting synthetic correlated-data, a child model, and/or a parent model to another component of system 100 (e.g., client device 104, database 106, and/or third-party 108) and/or to a computing component outside system 100. Providing synthetic correlated-data, a child model, and/or a parent model may include transmitting synthetic correlated-data, a child model, and/or a parent model may include displaying a representation of synthetic correlated-data, a child model, and/or a parent model at an interface (e.g., interface 422).

Systems and methods disclosed herein involve unconventional improvements over conventional approaches to generating intercorrelated datasets. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for generating synthetic intercorrelated data, the system comprising:
   one or more memory units for storing instructions; and
   one or more processors configured to execute the instructions to perform operations comprising:
      receiving a plurality of intercorrelated datasets;
      extracting individual ones of the plurality of intercorrelated datasets;
      generating latent-space data using a parent model; and
      training child models to generate synthetic data based on the latent-space data and the extracted intercorrelated-datasets.

2. The system of claim 1, wherein the plurality of intercorrelated datasets satisfy a threshold correlation metric.

3. The system of claim 1, wherein a subset of an intercorrelated dataset satisfies a threshold correlation metric with another intercorrelated dataset or with a subset of another intercorrelated dataset.

4. The system of claim 1, wherein a plurality of subsets of an intercorrelated dataset satisfy a threshold criterion metric.

5. The system of claim 1, wherein extracting includes transforming data to reduce the dimensionality of an intercorrelated dataset.

6. The system of claim 1, wherein the parent model is a generative adversarial network model.

7. The system of claim 1, wherein the child models are generative adversarial network models.

8. The system of claim 1, wherein the generated synthetic data satisfies a similarity metric with one of the intercorrelated datasets.

9. The system of claim 1, the operations further comprising:
   receiving a training criterion based on a similarity metric representing a measure of similarity between a synthetic dataset and an intercorrelated dataset;
   evaluating the synthetic data against the training criterion; and
   based on the evaluation, adjusting a parameter of at least one of the child models or terminating training of the at least one child model.

10. The system of claim 9, wherein the similarity metric is based on a correlation, covariance matrix, a variance, or a frequency of overlapping values.

11. The system of claim 1, the operations further comprising:
   comparing the synthetic data with the received plurality of intercorrelated datasets to determine a test correlation metric; and
   based on the test correlation metric, training the parent model.

12. The system of claim 11, wherein the operations are iteratively repeated until the test correlation metric satisfies a reference correlation metric.

13. The system of claim 1, the operations further comprising:
generating the intercorrelated data by combining the synthetic data generated by at least two of the child models; and
transmitting the intercorrelated data to a user device.

14. The system of claim 1, wherein generating the latent-space data is based on randomized input data.

15. The system of claim 1, the operations further comprising generating a synthetic database using the parent model and one of the child models.

16. The system of claim 1, wherein the parent model is a recurrent neural network model.

17. The system of claim 1, wherein the synthetic data comprises audio data, financial data, or demographic data.

18. The system of claim 1, wherein:
the parent model comprises a first and second parent model;
generating the latent space data comprises generating first latent-space data from the first parent model and generating second latent-space data from the second parent model; and
training the child models to generate synthetic data is based on the first and second latent-space data and the extracted intercorrelated-datasets.

19. A method for generating synthetic intercorrelated data, the method comprising:
receiving a plurality of intercorrelated datasets;
extracting individual ones of the plurality of intercorrelated datasets;
generating latent-space data using a parent model; and
training child models to generate synthetic data based on the latent-space data and the extracted intercorrelated-datasets.

20. The method of claim 19, the method further comprising:
receiving a training criterion based on a similarity metric representing a measure of similarity between a synthetic dataset and an intercorrelated dataset;
evaluating the synthetic data against the training criterion; and
based on the evaluation, adjusting a parameter of at least one of the child models or terminating training of the at least one child model.

* * * * *